(12) United States Patent
Liu et al.

(10) Patent No.: US 11,522,434 B2
(45) Date of Patent: Dec. 6, 2022

(54) LINEAR POSITIONING PLATFORM AND LINEAR POSITIONING SYSTEM BASED ON MAGNETIC TRANSMISSION

(71) Applicant: SOOCHOW UNIVERSITY, Suzhou (CN)

(72) Inventors: Jizhu Liu, Suzhou (CN); Licheng Fan, Suzhou (CN); Xiaoqi Zhang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 333 days.

(21) Appl. No.: 17/033,891

(22) Filed: Sep. 27, 2020

(65) Prior Publication Data

US 2021/0013789 A1 Jan. 14, 2021

Related U.S. Application Data

(63) Continuation of application No. PCT/US2019/087128, filed on May 16, 2019.

(30) Foreign Application Priority Data

May 7, 2019 (CN) .......................... 201910370504.5

(51) Int. Cl.
  *H02K 41/03* (2006.01)
  *H02P 25/064* (2016.01)
  *H02K 11/215* (2016.01)

(52) U.S. Cl.
  CPC ......... *H02K 41/031* (2013.01); *H02K 11/215* (2016.01); *H02P 25/064* (2016.02)

(58) Field of Classification Search
  CPC .... H02K 41/031; H02K 11/215; H02P 25/064
  See application file for complete search history.

(56) References Cited

U.S. PATENT DOCUMENTS 5,023,495 A * 6/1991 Ohsaka ................ H02K 41/031
  318/135
8,174,344 B2 * 5/2012 Yajima ............... H02K 41/0356
  335/229

FOREIGN PATENT DOCUMENTS

| CN | 101024270 A | 8/2007 |
| CN | 201774438 U | 3/2011 |

(Continued)

*Primary Examiner* — Zoheb S Imtiaz
(74) *Attorney, Agent, or Firm* — SZDC Law P.C.

(57) ABSTRACT

A linear positioning platform and a linear positioning system based on magnetic transmission are disclosed. The linear positioning platform includes a moving magnetic linear motor module and a magnetic transmission linear positioning module. The moving magnet linear motor module includes a base, a stator coil, a first yoke, and motor poles. There is a gap between the stator coil and motor pole. The magnetic transmission linear positioning module includes first mover poles, a magnetizing skeleton, a plurality of magnetizing blocks, a second yoke, and second mover poles. There is a gap between the first mover pole and magnetizing block and also between the magnetizing block and second mover pole. The linear positioning platform and linear positioning system have the characteristics of low cost, compact structure, high utilization rate of permanent magnets, high speed, high precision, high dynamic response, etc., which greatly promotes the development of related fields.

12 Claims, 6 Drawing Sheets

(56) References Cited

FOREIGN PATENT DOCUMENTS

| | | |
|---|---|---|
| CN | 109167503 A | 1/2019 |
| CN | 110336448 A | 10/2019 |
| WO | 2018055709 A1 | 3/2018 |
| WO | 2018055772 A | 3/2018 |

* cited by examiner

LINEAR POSITIONING PLATFORM AND LINEAR POSITIONING SYSTEM BASED ON MAGNETIC TRANSMISSION

This application is a Continuation Application PCT/2019/087128, filed on May 16, 2019, which claims priority to Chinese Patent Application No. 201910370504.5, filed on May 7, 2019, which is incorporated by reference for all purposes as if fully set forth herein.

TECHNICAL FIELD

The present invention relates to the technical field of automation equipment, in particular to a linear positioning platform and a linear positioning system based on magnetic transmission.

BACKGROUND

At present, the development of IC, semiconductor and 3C industries is increasingly prosperous, modern automation factories are continuously upgraded, and modern industries are increasingly demanding high-speed, high-precision and high-dynamic positioning platforms.

The linear positioning platform is widely used in the field of manufacturing and testing. The existing linear positioning platform is mainly realized by the method of "rotating motor+ball screw". Due to the limitation of the ball screw creep and rotatory driving method, the existing rotation The mass/power value of the existing rotating motor is relatively large, which makes linear positioning platform have the disadvantages of slow response, poor accuracy, slow speed, large volume, etc., and greatly restricts the development of manufacturing and other industries.

Therefore, in view of the above technical problems, it is necessary to provide a linear positioning platform and a linear positioning system based on magnetic transmission.

SUMMARY

In view of this, the objects of the present invention are to provide a linear positioning platform and a linear positioning system based on magnetic transmission. The present invention develops a high-speed, high-precision, high-dynamic linear positioning platform based on the principle of magnetic transmission, which effectively solves the problems that the existing linear motor positioning platform has poor accuracy, large volume, slow speed, poor stability and the like.

In order to achieve the above object, the technical solution provided by an embodiment of the present invention is as follows.

A linear positioning platform based on magnetic transmission includes a moving magnetic linear motor module and a magnetic transmission linear positioning module, wherein:

the moving magnet linear motor module includes a base, a stator coil fixedly installed on the base, a first yoke slidably installed on the base and located above the stator coil, and motor poles installed below the first yoke, and there is a gap between the stator coil and the motor pole; and the magnetic transmission linear positioning module includes first mover poles installed above the first yoke, a magnetizing skeleton with a plurality of gaps fixedly installed on the base and located above the first yoke, a plurality of magnetizing blocks embedded in the gaps on the magnetizing skeleton, a second yoke slidably installed on the magnetizing skeleton, and second mover poles installed below the second yoke, and there is a gap between the first mover pole and the magnetizing block and also between the magnetizing block and the second mover pole.

As a further improvement of the present invention, the motor poles comprise a plurality of alternately distributed motor N poles and motor S poles, the first mover poles comprise a plurality of alternately distributed first mover N pole poles and first mover S poles, and the second mover poles comprise a plurality of alternately distributed second mover N poles and second mover S poles.

As a further improvement of the present invention, the widths of the motor N pole and the motor S pole are equal, the widths of the first mover N pole and the first mover S pole are equal, the widths of the second mover N pole and the second mover S pole are equal, and the width of the magnetizing block, the gap width of the magnetizing skeleton, and the gap width between adjacent magnetizing blocks are equal.

As a further improvement of the present invention, the total width of the second mover poles is smaller than the total width of the first mover poles, the width of the first mover pole is larger than the width of the second mover pole, the second mover poles all participate in the transmission, the first mover poles partly participate in the transmission, and the number of pairs of first mover poles involved in the transmission is greater than the number of pairs of second mover poles.

As a further improvement of the present invention, the ratio of a thrust force of the first mover pole to a thrust force of the second mover pole is the ratio of the number of pairs of first mover poles participating in the transmission to the number of pairs of second mover poles, and the ratio of a displacement of the first mover pole to a displacement of the second mover pole is the ratio of the number of pairs of second mover poles to the number of pairs of first mover poles participating in the transmission.

As a further improvement of the present invention, the first yoke is slidably installed on the base through a first slider and a first linear guide, and the second yoke is slidably installed on the magnetizing skeleton through a second slider and a second linear guide.

As a further improvement of the present invention, baffles are fixedly installed on two sides of the base, and a plurality of anti-collision blocks are provided inside the baffle.

As a further improvement of the present invention, a magnetic scale is provided on a side of the base, a reading head is installed on the second yoke, and the reading head and the magnetic scale are used to obtain displacement information of the second yoke.

As a further improvement of the present invention, a plurality of photoelectric switches are provided on the base, a plurality of catches is installed on the second yoke, and the catches and the photoelectric switches are used to control the movement of the second yoke.

As a further improvement of the present invention, the photoelectric switches comprise one or more of an origin photoelectric switch, an end photoelectric switch, and a limit photoelectric switch, and the catches comprise a first catch and a second catch provided on ends of a side of the second yoke.

As a further improvement of the present invention, an adapter plate is installed on a side of the second yoke, and the reading head is fixedly installed on the adapter plate.

The technical solution provided by an embodiment of the present invention is as follows.

A linear positioning system based on magnetic transmission includes an encoder, a driver connected to the encoder, a controller connected to the driver, and a computer connected to the controller, wherein the encoder is a reading head in a linear positioning platform, the encoder is used to acquire displacement information of a second yoke, and the controller is used to convert the acquired displacement information of the second yoke into a displacement signal of a first yoke and send a pulse signal to the driver, and the driver is used to drive a moving magnet linear motor module according to the pulse signal.

The beneficial effects of the present invention are as follows.

The linear positioning platform and the linear positioning system based on magnetic transmission according to the present invention have the characteristics of low cost, compact structure, high utilization rate of permanent magnets, high speed, high precision, high dynamic response, etc., which greatly promotes the development of related fields.

BRIEF DESCRIPTION OF THE DRAWINGS

In order to more clearly explain the technical solutions in the embodiments of the present invention or in the prior art, the drawings required in the description of the embodiments or the prior art will be described briefly in the following. Obviously, the drawings in the following description are only some of the embodiments described in the present invention. For those skilled in the art, without paying any creative work, other drawings can also be obtained based on these drawings.

Figure 1:
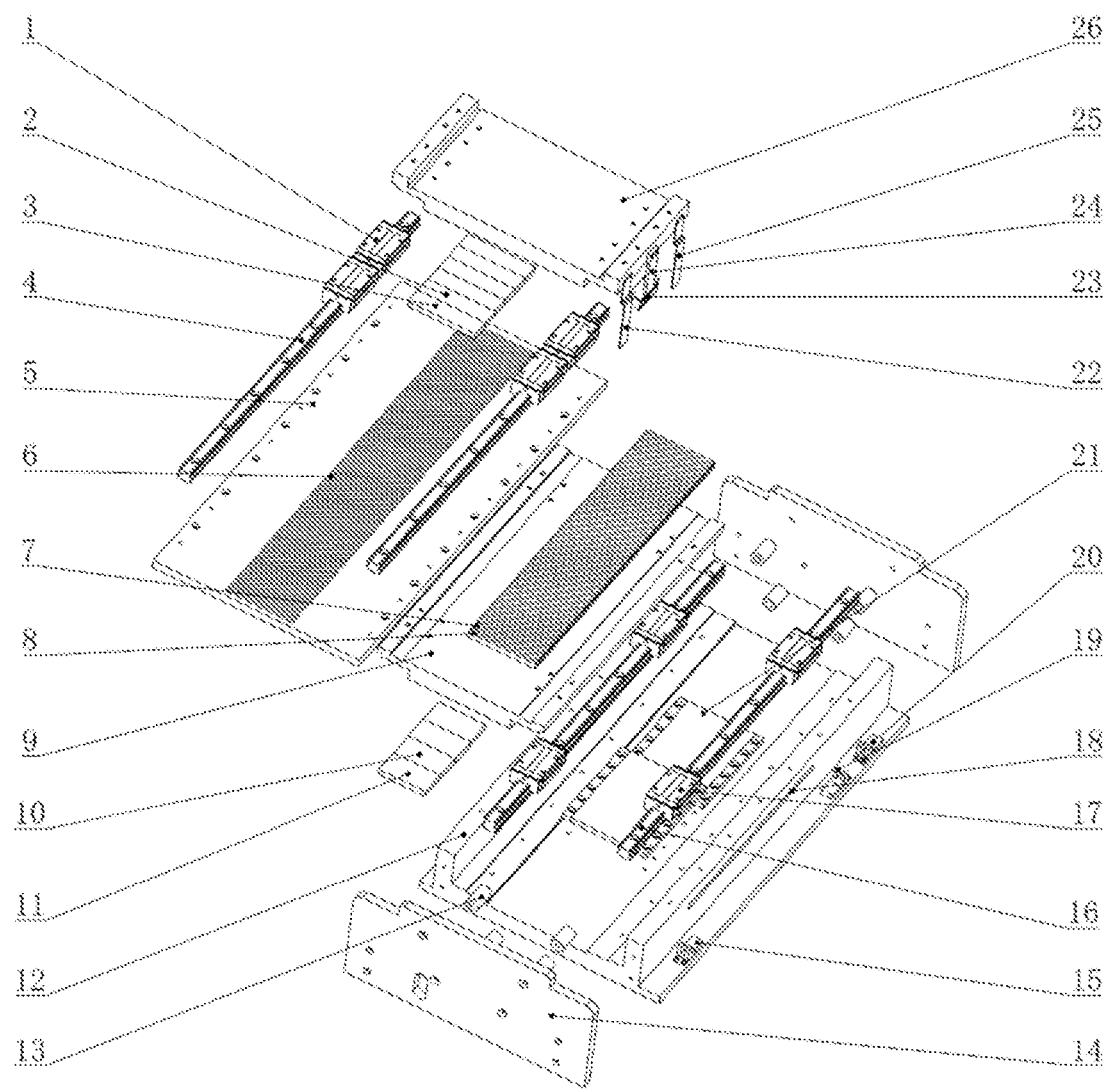
FIG. 1 is an exploded view of a linear positioning platform according to an embodiment of the present invention.

1, second slider; 2, second mover S pole; 3, second mover N pole; 4, second linear guide; 5, magnetizing skeleton; 6, magnetizing block; 7, first mover S pole; 8, first mover N pole; 9, first yoke; 10, motor S pole; 11, motor N pole; 12, base; 13, anti-collision block; 14, baffle; 15, end photoelectric switch; 16, first linear guide; 17, first slider; 18, magnetic scale; 19, origin photoelectric switch; 20, limit photoelectric switch; 21, stator coil; 22, first catch; 23, reading head; 24, adapter plate; 25, second catch; 26, second yoke; 27, computer; 28, controller; 29, driver; 30, encoder (the encoder is the reading head).

DETAILED DESCRIPTION

In order to enable those skilled in the art to better understand the technical solutions in the present invention, the technical solutions in the embodiments of the present invention will be described clearly and completely in conjunction with the drawings in the embodiments of the present invention. Obviously, the described embodiments are only a part of the embodiments of the present invention, but not all the embodiments. Based on the embodiments of the present invention, all other embodiments obtained by those skilled in the art without creative work shall fall within the scope of protection of the present invention.

Terms such as "left", "left side", "right", "right side", etc. used herein to indicate the spatial relative position are used for describing purposes to describe the relationship of a unit or feature as shown in the drawings with respect to another unit or feature. The term of spatial relative position may be intended to include different orientations of a device other than those shown in the figures during use or operation. For example, if the device in the figure is turned over, the unit described as being on the "left side" of the other unit or feature will be on the "right side" of the other unit or feature. Therefore, the exemplary term "left side" may encompass both left and right orientations. The device can be oriented in other ways (rotated 90 degrees or at other orientations) and interpret the space-related descriptors used herein accordingly.

The present invention discloses a linear positioning platform based on magnetic transmission, including a moving magnetic linear motor module and a magnetic transmission linear positioning module.

The moving magnetic linear motor module includes a base, a stator coil fixedly installed on the base, a first yoke slidably installed on the base and located above the electronic coil, and a motor pole installed below the first yoke. There is a gap between the stator coil and the motor pole.

The magnetic transmission linear positioning module includes a first mover pole installed above the first yoke, a magnetizing skeleton with a plurality of gaps fixedly installed on the base and located above the first yoke, a plurality of magnetizing blocks embedded in the gaps on the magnetizing skeleton, a second yoke slidably installed on the magnetizing skeleton, and a second mover pole installed below the second yoke. There is a gap between the first mover pole and the magnetizing block and also between the magnetizing block and the second mover pole.

The present invention also discloses a linear positioning system based on magnetic transmission, which includes an encoder, a driver connected to the encoder, a controller connected to the driver, and a computer connected to the controller. The encoder is a reading head in a linear positioning platform and used to obtain displacement information of a second yoke. The controller is used to convert the acquired displacement information of the second yoke into a displacement signal of a first yoke and send a pulse signal to the driver. The driver is used to drive a moving magnet linear motor module according to the pulse signal.

The present invention will be described in detail below in conjunction with specific embodiments.

Figure 2:
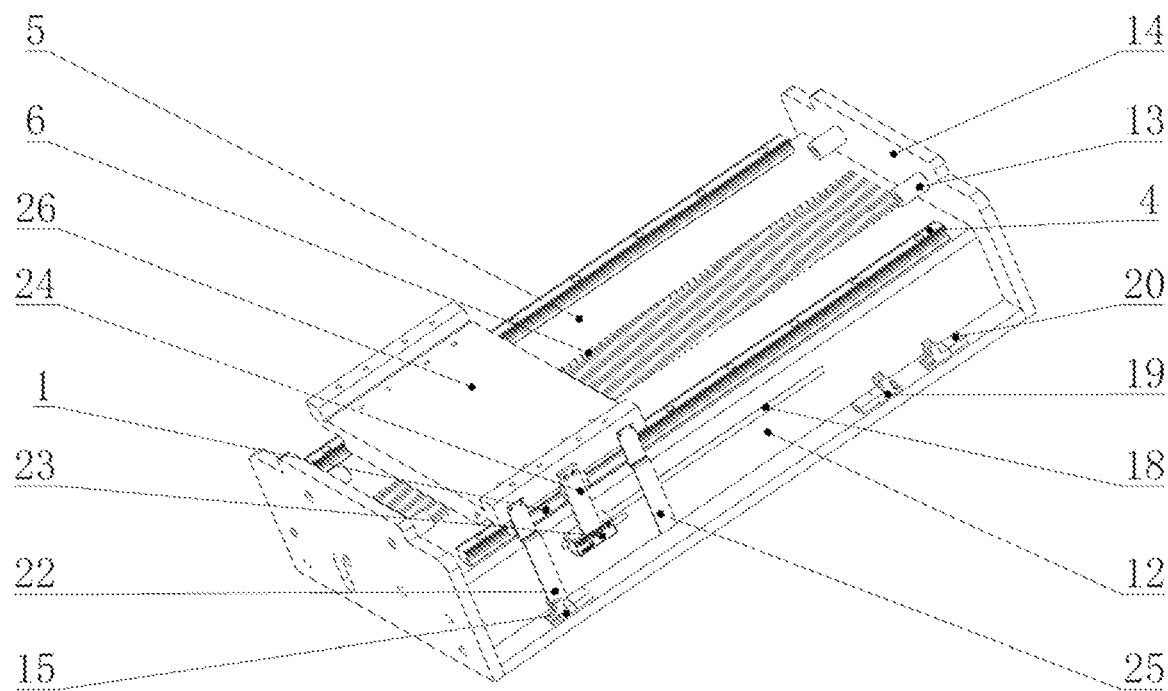
FIG. 2 is a perspective view of a linear positioning platform according to an embodiment of the present invention.
Figure 3:
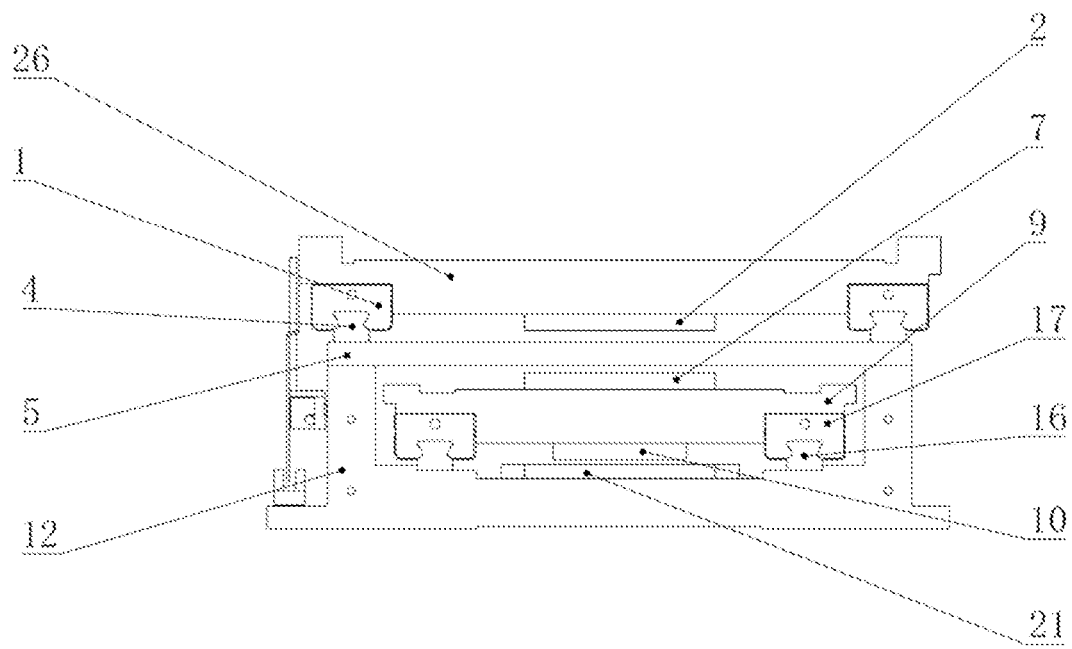
FIG. 3 is a cross-sectional view of a linear positioning platform according to an embodiment of the present invention.

As shown in FIGS. 1 to 3, in a specific embodiment of the present invention, a linear positioning platform based on magnetic transmission is composed of a moving magnetic linear motor module and a magnetic transmission linear positioning module.

The moving magnet linear motor module includes a base 12, a stator coil 21 fixedly installed on the base 12, a first yoke 9 slidably installed on the base 12 and located above the electronic coil 21, and motor poles installed below the first yoke 9. There is a gap between the stator coil and the motor pole.

The magnetic transmission linear positioning module includes first mover poles installed above the first yoke 9, a magnetizing skeleton 5 with a plurality of gaps fixedly installed on the base 12 and located above the first yoke 9, a plurality of magnetizing blocks 6 embedded in the gaps on the magnetizing skeleton 5, a second yoke 26 slidably installed on the magnetizing skeleton 5, and second mover poles installed below the second yoke 26. There is a gap between the first mover pole and the magnetizing block and also between the magnetizing block and the second mover pole.

The motor poles include a plurality of alternately distributed motor N poles 11 and motor S poles 10. The first mover poles include a plurality of alternately distributed first mover N poles 8 and first mover S poles 7. The second mover poles include a plurality of alternately distributed second mover N poles 3 and second mover S poles 2.

The first yoke 9 is slidably installed on the base 12 through a first slider 17 and a first linear guide 16. The second yoke 26 is slidably installed on the magnetizing skeleton 5 through a second slider 1 and a second linear guide 4.

A baffle 14 is fixedly installed on each side of the base 12. A plurality of anti-collision blocks 13 is provided inside the baffle 14. A magnetic scale 18 is provided on a side of the base 12. A reading head 23 is installed on the second yoke 26. The reading head 23 and the magnetic scale 18 are used to obtain displacement information of the second yoke. An adapter plate 24 is installed on a side of the second yoke 26. The reading head 23 is fixedly installed on the adapter plate 24.

Further, a plurality of photoelectric switches is provided on the base 12. A plurality of catches is installed on the second yoke 26. The catches and the photoelectric switches are used to control the movement of the second yoke. The photoelectric switches include an origin photoelectric switch 19, an end photoelectric switch 15, and a limit photoelectric switch 20. The catches include a first catch 22 and a second catch 25 provided at ends of a side of the second yoke 26.

Specifically, the assembly process of the linear positioning platform in this embodiment is as follows.

The baffle 14 and the base 12 are connected by bolts. The anti-collision blocks 13 are connected to the baffle 14 by bolts. The anti-collision blocks 13 play a protective role.

The magnetic scale 18 is pasted on a side of the base 12. The reading head 23 and the adapter plate 24 are connected by bolts. The adapter plate 24 is connected to the second yoke 26 by bolts. There is a certain gap between the reading head 23 and the magnetic scale 18 which is adjusted to ensure that the reading head receives accurate movement information.

The end photoelectric switch 15, the origin photoelectric switch 19, and the limit photoelectric switch 20 are all connected to the base 12 by bolts. The distance between the origin photoelectric switch 19 and the end photoelectric switch 15 is adjusted to be used as a movement stroke of a high-speed mover.

The first catch 22 and the second catch 25 are connected to a side of the second yoke 26 by bolts, and are used in conjunction with the end photoelectric switch 15, the origin photoelectric switch 19, and the limit photoelectric switch 20 to control the movement of the mover.

The magnetizing blocks 6 are inserted into the gaps of the magnetizing skeleton 5. The magnetizing skeleton 5 and the magnetizing blocks 6 are connected together by viscose to prevent from being sucked down by magnets.

The stator coil 21 is glued and connected to the base 12 by bolts.

The first linear guide 16 is fixed on the base 12 by bolts. In order to ensure smooth movement of the linear positioning platform, the guides must be parallel.

The first yoke 9 and the first slider 17 on the first linear guide 16 are connected by bolts. The motor S poles 10 and the motor N poles 11 are fixed to a lower side of the first yoke 9 by structural adhesive to ensure that the motor S poles 10 and the motor N poles 11 are alternately arranged in order to guarantee the normal operation of a electromagnetic drive module.

The first mover S poles 7 and the first mover N poles 8 are fixed on an upper side of the first yoke 9 by structural adhesive to ensure that the first mover S poles 7 and the first mover N poles 8 are alternately arranged in order to guarantee the normal operation of a magnetic transmission structure.

After the above assembly is completed, the magnetizing skeleton 5 embedded with the magnetizing blocks 6 is connected to the base 12 by bolts, and then the second linear guide 4 is fixed to the magnetizing skeleton 5 by bolts. In order to ensure smooth movement of the linear positioning platform, the guides must be parallel.

The second yoke 26 is connected to the second slider 1 on the second linear guide 4 by bolts. The second mover S poles 2 and the second mover N poles 3 are fixed to a lower side of the second yoke 26 by structural adhesive to ensure that the second mover S poles 2 and the second mover N poles 3 are alternately arranged in order to guarantee the normal operation of the magnetic transmission structure.

The first yoke and the second yoke in this embodiment are a low-speed mover yoke and a high-speed mover yoke, respectively. The motor S poles 10 and the motor N poles 11 are motor magnet S poles and motor magnet N poles, respectively. The first mover S poles 7 and the first mover N poles 8 are low-speed mover magnet S poles and low-speed mover magnet N poles, respectively. The second mover S poles 2 and the second mover N poles 3 are high-speed mover magnet S poles and high-speed mover magnet N poles, respectively.

Figure 4:
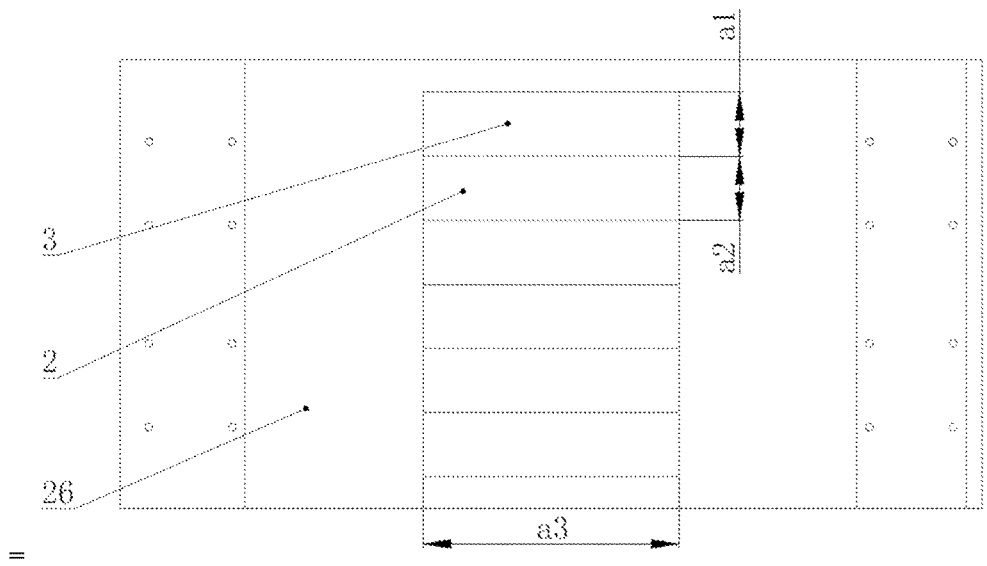
FIG. 4 is a structural diagram of a lower surface of a high-speed mover (second mover) according to an embodiment of the present invention.

As shown in FIG. 4, the second mover S poles 2 and the second mover N poles 33 are pasted on the second yoke 26. The second mover S poles 2 and the second mover N poles 3 are alternately arranged. The poles are the same in shape and size. The width a1 of the second mover N pole 33 is equal to the width a2 of the second mover S pole 2.

Figure 5:
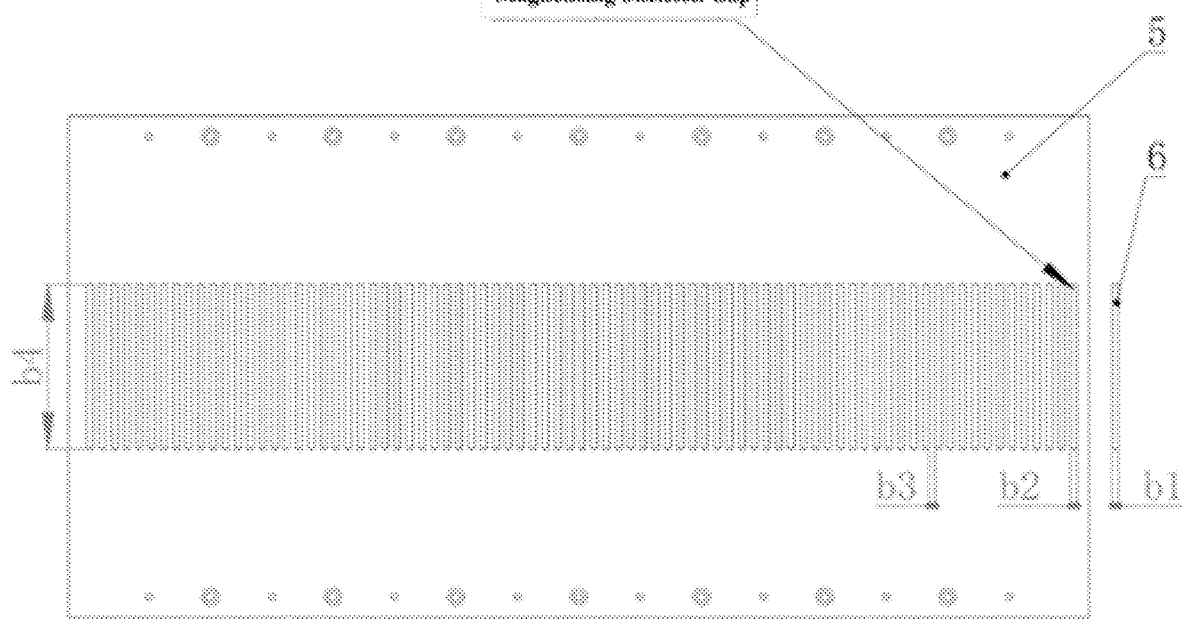
FIG. 5 is a structural diagram of an upper surface of a magnetizing device (magnetizing skeleton and magnetizing block) according to an embodiment of the present invention.

As shown in FIG. 5, a plurality of magnetizing blocks 6 are inserted into the gaps of the magnetizing skeleton 5. The width of the magnetizing block 6 is b1. The width of the magnetizing skeleton 5 is b2. After the magnetizing blocks 6 are inserted into the magnetizing skeleton 5, the gap width between the magnetizing blocks is b3, satisfying b1=b2=b3.

Figure 6:
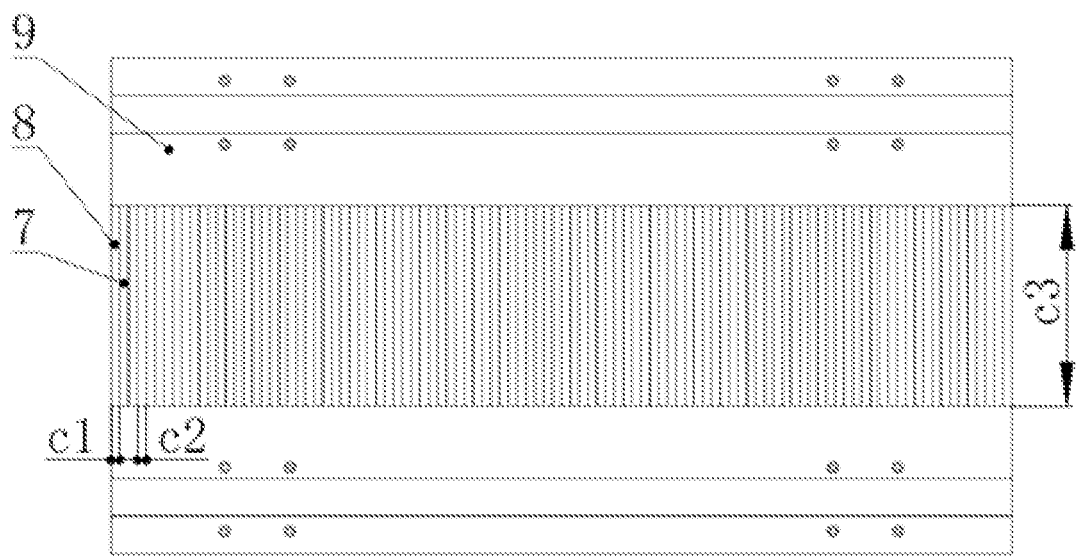
FIG. 6 is a structural diagram of an upper surface of a low-speed mover (first mover) according to an embodiment of the present invention.

As shown in FIG. 6, the first mover S poles 7 and the first mover N poles 8 are pasted on an upper side of the first yoke 9. The first mover S poles 7 and the first mover N poles 8 are alternately arranged. The poles are the same in shape and size. The width c1 of the first mover N pole 8 is equal to the width c2 of the first mover S pole 7.

Figure 7:
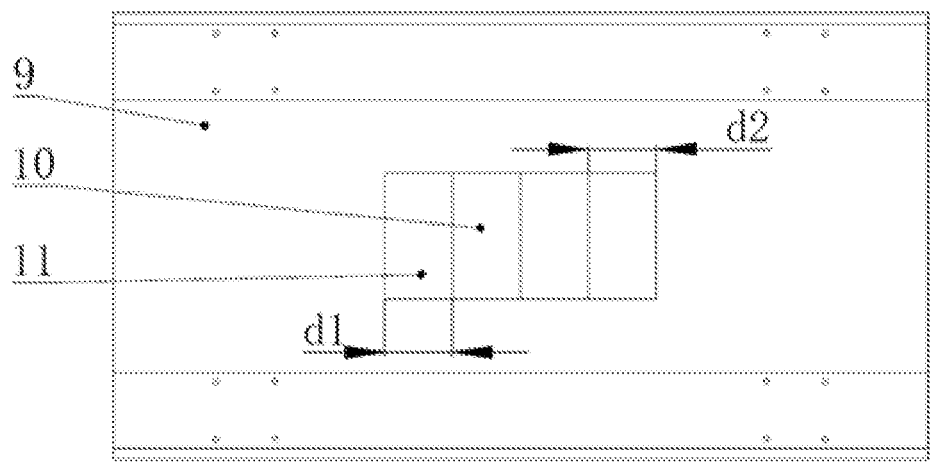
FIG. 7 is a structural diagram of a lower surface of a low-speed mover (first mover) according to an embodiment of the present invention.

As shown in FIG. 7, the motor S poles 10 and the motor N poles 11 are pasted on a lower side of the first yoke 9. The motor S poles 10 and the motor N poles 11 are alternately arranged. The poles are the same in shape and size. The width d1 of the motor N pole 11 is equal to the width d2 of the motor S pole 10.

The movement principle of the magnetic transmission high-precision linear platform is described in detail below with reference to FIGS. 4 to 9. The linear positioning platform is composed of a moving magnetic linear motor module and a magnetic transmission linear positioning module.

In the moving magnet linear motor module, the number of pairs of motor poles (motor S poles 10 and motor N poles 11) is $N_d$, the width of the motor N pole 11 is d1, the width of the motor S pole 10 is d2, and the total width of the motor poles is $L_d$, the width of each set of motor stator coils is $L_e$, in which the relationship between the parameters is:

$$L_d = N_d \cdot (d_1 + d_2)$$

$$L_d = L_e$$

Therefore, the coupling of the motor poles and the motor stator coils can be achieved. Multiple sets of motor stator coils 21 are used to ensure the stable operation of the motor. There is a gap between the motor stator coil 21 and the motor pole (the gap is enlarged in the figure). When a three-phase alternating current flows through the stator coil 21, a traveling wave magnetic field is generated in the gap. The motor pole is cut by the traveling wave magnetic field, which will induce an electromotive force and generate a current. This current interacts with the magnetic field in the gap to generate an electromagnetic thrust to push the low-speed mover into linear movement.

Figure 8:
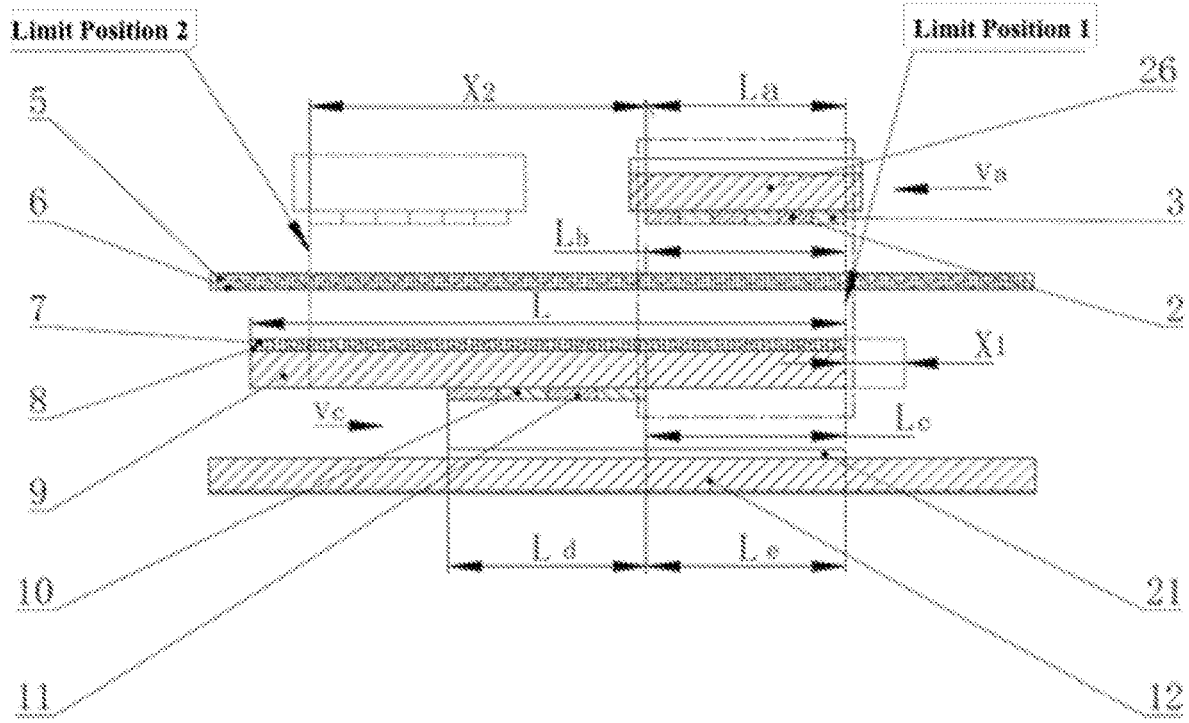
FIG. 8 is a schematic diagram of the movement principle of a linear positioning platform according to an embodiment of the present invention.
Figure 9:
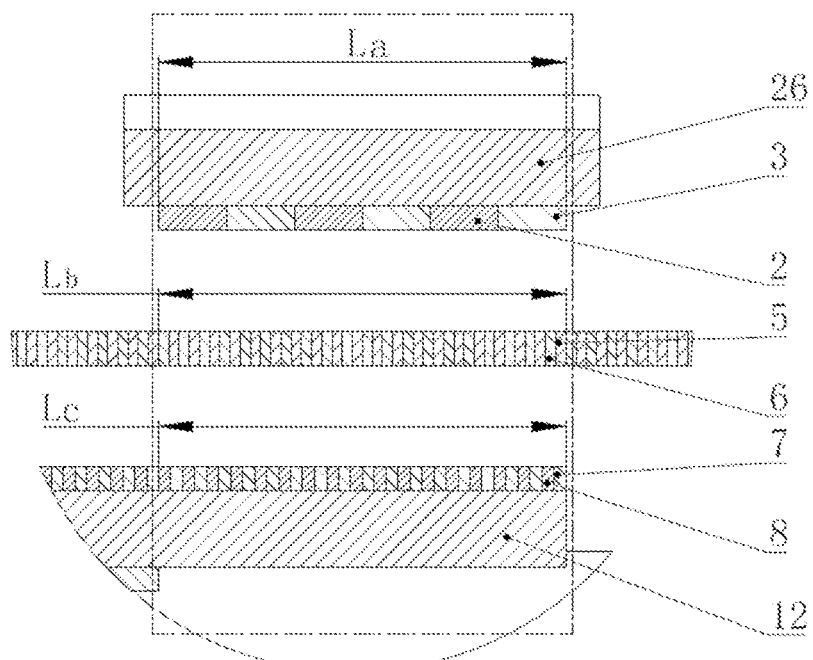
FIG. 9 is a structural diagram of a part of which movement instantaneously participates in magnetic transmission according to an embodiment of the present invention.

In the magnetic transmission linear positioning module, the dotted line frame in FIG. 8 and FIG. 9 is the part of the magnetic transmission platform that participates in the magnetic transmission instantaneously. There is a small gap (enlarged in the figure) among the first mover pole, the magnetizing block, and the second mover pole. The magnetizing block adjusts the magnetic field generated by the two mover poles and generates a spatial harmonic in the space gap. The adjusted magnetic field interacts with the magnetic field on the other side through the magnetizing block to transfer thrust and speed.

The width of the second mover N pole 3 is a1, the width of the second mover S pole 2 is a2, the second mover poles have $N_a$ pairs of poles, the total width of the second mover poles is $L_a$, the moving speed is $v_a$, the movement time is t, the movement displacement is $X_2$, the thrust is $F_2$, and the second mover poles participates in the transmission in the whole process.

The width of the first mover N pole 8 is c1, the width of the first mover S pole 7 is c2, the first mover poles have $N_{c1}$ pairs of poles, the total width of the first mover poles is $L_{C1}$, the movement speed is $v_c$, the movement time is t, the movement displacement is $X_1$, the thrust is $F_1$, the number of pairs of first mover poles participating in the transmission is $N_{c2}$, and the total width of the first mover poles participating in the transmission is $L_{C2}$.

The width of the magnetizing block 6 is b1, the gap width of the magnetizing block skeleton 5 is b2, and after the magnetizing blocks 6 are embedded in the magnetizing block skeleton 5, the gap width between magnetizing blocks is b3, where b1=b2=b3. The magnetizing blocks are fixed as a whole, the speed is $v_b$=0, the number of magnetizing blocks participating in the transmission is $N_b$, and the total width of the magnetizing blocks participating in the transmission is $L_b$.

The relationship between the parameters is as follows:

$$\begin{cases} a1 = a2 \\ L_a = N_a \cdot (a1 + a2); \\ X_2 = v_a \cdot t \end{cases}$$

$$\begin{cases} b1 = b2 = b3 \\ L_b = N_b \cdot (b1 + b3) \end{cases};$$

$$\begin{cases} c1 = c2 \\ L_{c1} = N_{c1} \cdot (c1 + c2), L_{c2} = N_{c2} \cdot (c1 + c2). \\ X_1 = v_c \cdot t \end{cases}$$

To maximize the thrust density, let:

$$N_b = N_{c2} + N_a;$$

At this time, the speed relationship of each part is:

$$v_a = \frac{N_b}{N_b - N_{c2}} v_b - \frac{N_{c2}}{N_b - N_{c2}} v_c;$$

Because the magnetizing blocks are fixed, $v_b$=0, and:

$$v_a = -\frac{N_{c2}}{N_b - N_{c2}} v_c = -\frac{N_{c2}}{N_a} v_c;$$

In order to obtain a high-speed large-displacement output, $N_{c2} > N_a$, the relationship between the mover thrusts is:

$$\frac{F_1}{F_2} = \frac{N_{c2}}{N_a}.$$

It can be seen that the magnetic transmission positioning platform can obtain a high-speed large-displacement output, but it will reduce the thrust to a certain extent. At this time, the directions of movement of the two movers are opposite, and the ratio of the displacements is:

$$\frac{|X_1|}{|X_2|} = \frac{|v_c \cdot t|}{|v_a \cdot t|} = \frac{N_a}{N_{c2}};$$

When the mover moves from a limit position 1 to a limit position 2, we can get:

$$L_{c1} = X_2 + L_a + X_1.$$

Figure 10:
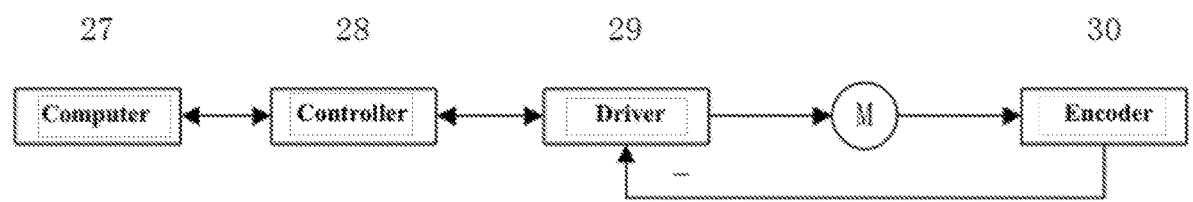
FIG. 10 is a structural diagram of a module of a linear positioning system according to an embodiment of the present invention.

As shown in FIG. 10, a linear positioning system based on magnetic transmission according to another specific embodiment of the present invention includes a computer 27, a controller 28, a driver 29, and an encoder 30. The computer 27 and the controller 28 are connected by an Ethernet cable to exchange information. The controller 28 is programmed through the computer 27. The controller 28 transmits parameters fed back by the system to the computer 27 for display, so as to issue a corresponding pulse signal to the driver 29 according to the program. The controller 28 and the driver 29 are connected by a wire. The encoder 30 and the driver 29 are connected by a wire. The controller 28 transmits the calculated number of pulses to the driver. The driver also outputs a corresponding signal to drive the motor to move. The encoder 30 collects position information of the motor and feeds back a position parameter of the motor to the driver, so as to determine whether the motor has moved to the corresponding position.

Since the reading head 23 is connected to the second yoke 26, the received displacement signal belongs to a high-speed mover, and the driver 29 can only drive the motor to move, the received displacement signal $X_2$ cannot be directly fed back to the driver to control the movement of the motor. The displacement signal $X_2$ needs to be multiplied by $$\frac{N_a}{N_{c2}}$$

and transformed into a displacement signal $X_1$. The direction of the displacement signal $X_1$ is opposite to the direction of the displacement signal $X_2$. Then, the displacement signal $X_1$ is fed back to the driver to control the movement of the motor in order to control the movement of the high-speed mover.

The present invention is composed of a moving magnetic linear motor module and a magnetic transmission linear positioning module. The linear motor adopts a moving magnetic structure, the coil is a stator, and the total volume is small. The motor and the magnetic transmission platform are mechanically connected.

The magnetic transmission platform contains three parts: a low-speed mover, a magnetizing block, and a high-speed mover. The low-speed mover has many magnetic poles and the high-speed mover has very few magnetic poles. Speed increasing can be achieved through the action of electromagnetic force. At the same time, based on the principle of magnetic field modulation-type magnetic transmission, the use of magnetizing blocks can increase the permanent magnet utilization rate, thrust density, accuracy and stability of the positioning platform. The magnetic transmission platform has built-in overload protection, which has high reliability due to no friction during work and does not require lubrication.

The linear motor mover yoke is a low-speed mover yoke. The first mover poles and the linear motor poles are respectively pasted to upper and lower sides of the mover yoke to realize the compound of the linear motor and the magnetic transmission platform. The movement of the motor poles drives the movement of the first mover poles. The movement with a low speed and a small displacement can obtain the movement of the second mover with a high speed and a large displacement, which greatly reduces the volume of the stator and reduces the cost of use.

It can be seen from the above technical solutions that the present invention has the following beneficial effects:

The linear positioning platform and the linear positioning system based on magnetic transmission according to the present invention have the characteristics of low cost, compact structure, high utilization rate of permanent magnets, high speed, high precision, high dynamic response, etc., which greatly promotes the development of related fields.

It will be apparent to those skilled in the art that the present invention is not limited to the details of the above exemplary embodiments, and that the present invention can be implemented in other specific forms without departing from the spirit or basic characteristics of the present invention. Therefore, regardless of the point of view, the embodiments should be regarded as exemplary and non-limiting, the scope of the present invention is defined by the appended claims rather than the above description, and therefore all changes falling within the meaning and scope of the equivalent elements of the claims are included in the present invention. Any reference signs in the claims should not be considered as limiting the claims involved.

In addition, it should be understood that although the description is described in terms of embodiments, not every embodiment only contains an independent technical solution. This narration of the description is for clarity only, and those skilled in the art should take the description as a whole. The technical solutions in the embodiments can also be combined appropriately to form other implementations that can be understood by those skilled in the art.

The invention claimed is:

1. A linear positioning platform based on magnetic transmission, comprising a moving magnetic linear motor module and a magnetic transmission linear positioning module, wherein:

the moving magnet linear motor module comprises a base, a stator coil fixedly installed on the base, a first yoke slidably installed on the base and located above the stator coil, and motor poles installed below the first yoke, and there is a gap between the stator coil and the motor pole; and the magnetic transmission linear positioning module comprises first mover poles installed above the first yoke, a magnetizing skeleton with a plurality of gaps fixedly installed on the base and located above the first yoke, a plurality of magnetizing blocks embedded in the gaps on the magnetizing skeleton, a second yoke slidably installed on the magnetizing skeleton, and second mover poles installed below the second yoke, and there is a gap between the first mover pole and the magnetizing block and also between the magnetizing block and the second mover pole.

2. The linear positioning platform based on magnetic transmission according to claim 1, wherein the motor poles comprise a plurality of alternately distributed motor N poles and motor S poles, the first mover poles comprise a plurality of alternately distributed first mover N pole poles and first mover S poles, and the second mover poles comprise a plurality of alternately distributed second mover N poles and second mover S poles.

3. The linear positioning platform based on magnetic transmission according to claim 2, wherein the widths of the motor N pole and the motor S pole are equal, the widths of the first mover N pole and the first mover S pole are equal, the widths of the second mover N pole and the second mover S pole are equal, and the width of the magnetizing block, the gap width of the magnetizing skeleton, and the gap width between adjacent magnetizing blocks are equal.

4. The linear positioning platform based on magnetic transmission according to claim 3, wherein the total width of the second mover poles is smaller than the total width of the first mover poles, the width of the first mover pole is larger than the width of the second mover pole, the second mover poles all participate in the transmission, the first mover poles partly participate in the transmission, and the number of pairs of first mover poles involved in the transmission is greater than the number of pairs of second mover poles.

5. The linear positioning platform based on magnetic transmission according to claim 4, wherein the ratio of a thrust force of the first mover pole to a thrust force of the second mover pole is the ratio of the number of pairs of first mover poles participating in the transmission to the number of pairs of second mover poles, and the ratio of a displacement of the first mover pole to a displacement of the second mover pole is the ratio of the number of pairs of second mover poles to the number of pairs of first mover poles participating in the transmission.

6. The linear positioning platform based on magnetic transmission according to claim 1, wherein the first yoke is slidably installed on the base through a first slider and a first linear guide, and the second yoke is slidably installed on the magnetizing skeleton through a second slider and a second linear guide.

7. The linear positioning platform based on magnetic transmission according to claim 1, wherein baffles are fixedly installed on two sides of the base, and a plurality of anti-collision blocks are provided inside the baffle.

8. The linear positioning platform based on magnetic transmission according to claim 1, wherein a magnetic scale is provided on a side of the base, a reading head is installed on the second yoke, and the reading head and the magnetic scale are used to obtain displacement information of the second yoke.

9. The linear positioning platform based on magnetic transmission according to claim 8, wherein a plurality of photoelectric switches are provided on the base, a plurality of catches is installed on the second yoke, and the catches and the photoelectric switches are used to control the movement of the second yoke.

10. The linear positioning platform based on magnetic transmission according to claim 9, wherein the photoelectric switches comprise one or more of an origin photoelectric switch, an end photoelectric switch, and a limit photoelectric switch, and the catches comprise a first catch and a second catch provided on ends of a side of the second yoke.

11. The linear positioning platform based on magnetic transmission according to claim 8, wherein an adapter plate is installed on a side of the second yoke, and the reading head is fixedly installed on the adapter plate.

12. A linear positioning system based on magnetic transmission, comprising an encoder, a driver connected to the encoder, a controller connected to the driver, and a computer connected to the controller, wherein the encoder is a reading head in a linear positioning platform, the encoder is used to acquire displacement information of a second yoke, and the controller is used to convert the acquired displacement information of the second yoke into a displacement signal of a first yoke and send a pulse signal to the driver, and the driver is used to drive a moving magnet linear motor module according to the pulse signal.

* * * * *